(12) United States Patent
Da Silva et al.

(10) Patent No.: US 9,051,057 B2
(45) Date of Patent: Jun. 9, 2015

(54) AIRCRAFT AIR INLET DIVERTER ASSEMBLIES WITH IMPROVED AERODYNAMIC CHARACTERISTICS

(71) Applicant: Embraer S.A., São José dos Campos-SP (BR)

(72) Inventors: Carlos Roberto Ilário Da Silva, São José dos Campos (BR); André Luis Roncatto, São José dos Campos (BR); Antônio Nunes Belém, São José dos Campos (BR); Marcelo Faria Da Cunha, São José dos Campos (BR)

(73) Assignee: EMBRAER S.A., São José Dos Campos—SP (BR)

( * ) Notice: Subject to any disclaimer, the term of this patent is extended or adjusted under 35 U.S.C. 154(b) by 73 days.

(21) Appl. No.: 13/725,534

(22) Filed: Dec. 21, 2012

(65) Prior Publication Data
US 2013/0168502 A1    Jul. 4, 2013

Related U.S. Application Data

(60) Provisional application No. 61/580,969, filed on Dec. 28, 2011.

(51) Int. Cl.
*B64D 33/02* (2006.01)
*B64D 41/00* (2006.01)

(52) U.S. Cl.
CPC ............... *B64D 41/00* (2013.01); *B64D 33/02* (2013.01); *B64D 2033/0206* (2013.01); *Y02T 50/53* (2013.01); *B64D 2033/0213* (2013.01); *B64D 2241/00* (2013.01)

(58) Field of Classification Search
USPC .................... 244/53 B, 58, 130, 129.1
See application file for complete search history.

(56) References Cited

U.S. PATENT DOCUMENTS

| | | | | |
|---|---|---|---|---|
| 2,352,790 A * | 7/1944 | Jordan | ........................... | 244/130 |
| 2,694,357 A * | 11/1954 | Lee | ................................. | 454/76 |
| 4,174,083 A * | 11/1979 | Mohn | ......................... | 244/53 B |
| 5,694,763 A * | 12/1997 | Amelio et al. | ............. | 60/39.092 |
| 6,651,929 B2 * | 11/2003 | Dionne | .......................... | 244/57 |
| 6,942,181 B2 * | 9/2005 | Dionne | .......................... | 244/57 |
| 7,597,283 B2 * | 10/2009 | Hernanz Manrique et al. | | 244/53 B |
| 7,665,694 B2 * | 2/2010 | Hein et al. | .................. | 244/129.5 |
| 8,079,550 B2 * | 12/2011 | Brill et al. | .................. | 244/129.4 |
| 8,096,498 B2 * | 1/2012 | Francisco | ................... | 244/53 B |
| 8,113,767 B2 * | 2/2012 | Brill et al. | ..................... | 415/119 |
| 8,141,816 B2 * | 3/2012 | Robbins et al. | .............. | 244/53 B |
| 8,403,264 B2 * | 3/2013 | Schiek et al. | ............. | 244/129.4 |
| 8,544,799 B2 * | 10/2013 | Da Silva et al. | ............. | 244/130 |
| 8,721,406 B2 * | 5/2014 | Kastell et al. | ................... | 454/76 |
| 2006/0102779 A1 * | 5/2006 | Campbell et al. | ........... | 244/53 B |
| 2006/0163425 A1 * | 7/2006 | Brown et al. | ................ | 244/53 B |
| 2006/0196993 A1 * | 9/2006 | Hein et al. | ................. | 244/53 B |
| 2008/0179466 A1 * | 7/2008 | Campbell et al. | ........... | 244/53 B |

(Continued)

*Primary Examiner* — Benjamin P Lee
(74) *Attorney, Agent, or Firm* — Nixon & Vanderhye P.C.

(57) ABSTRACT

Diverter assemblies for aircraft air inlets include a diverter structure at least substantially surrounding the air inlet, and a fairing mounted to an upper edge of the diverter structure forwardly of the air inlet.

12 Claims, 5 Drawing Sheets

(56) References Cited

U.S. PATENT DOCUMENTS

| | | | |
|---|---|---|---|
| 2012/0006938 A1* | 1/2012 | Gatzke | 244/58 |
| 2012/0292455 A1* | 11/2012 | DeDe et al. | 244/53 B |
| 2013/0001369 A1* | 1/2013 | Light et al. | 244/53 B |
| 2013/0228648 A1* | 9/2013 | Light et al. | 244/58 |

* cited by examiner

AIRCRAFT AIR INLET DIVERTER ASSEMBLIES WITH IMPROVED AERODYNAMIC CHARACTERISTICS

CROSS-REFERENCE TO RELATED APPLICATION

This application is based on and claims domestic priority benefits under 35 USC §119(e) from U.S. Provisional Patent Application Ser. No. 61/580,969 filed on Dec. 28, 2011, the entire content of which is expressly incorporated hereinto by reference.

FIELD

The embodiments disclosed herein relate generally to aircraft inlet structures, and more particularly, to aircraft fuselage inlets provided with diverter structures having improved aerodynamic characteristics.

BACKGROUND

Commercial aircraft (e.g., regional jets) are usually equipped with an Auxiliary Power Unit (APU) that provides shaft and pneumatic power to different aircraft systems, including electronics and on-board electrical equipment, avionics, main engine air starters, air conditioning units and the like, before and during the flight. The conventional APU is a small gas turbine engine often located in the aircraft tail, fuselage wing root or fuselage wheel well area. Historically, the first commercial aircraft to have an APU installed was an early (circa 1963) model Boeing 727. At that time there were no ground support equipment at smaller airport facilities to support aircraft operations. Since then, different APUs have been installed in different types of aircraft that operated in smaller and less sophisticated airports. Since the APU allowed aircraft to operate independently from ground support equipment, the APU has contributed to air traffic expansion. The APU has thus been consolidated in civil and also military aircraft. Its function in the aircraft through many decades has progressed from main engine start on the ground to providing a source of electrical and pneumatic power while the aircraft is on ground or during flight.

Due to the increase of APU importance for aircraft operations, it has continually been subjected to improvement and sophistication of its components to achieve improved performance with reduced operational costs, within safe conditions. In order to reach this goal, the integration of the APU in the aircraft is one important aspect that must be considered by both aircraft manufacturer and APU supplier. This integration of the APU in the aircraft constitutes an important and relatively difficult challenge related to an attempt to find an optimal design through a very large number of design constraints.

Every APU has technical specifications that must be observed and complied with during its installation in the aircraft so that the APU can provide its minimum performance during any operational condition. One of these requirements is strongly correlated with the air intake that is necessary for APU functionality. The embodiments disclosed herein are therefore directed toward optimizing air intakes for not only on-board APUs but also air intakes for other related aircraft components, for example an aircraft APU Air Cooling Oil Cooler (ACOC).

A diverter is typically provided with APU air inlet ducts and serves as a shielding device to prevent undesired fluids (e.g., inflammable fluids) from being ingested by the duct. However, the diverter is a fixed structure which thus generates additional aerodynamic drag to the aircraft. In the worldwide context of development of "green technologies" with the aim to reduce pollutant emissions, many research efforts are underway to identify improved solutions to reduce the aircraft aerodynamic drag and therefore lower the fuel consumption.

On prior example to address this problem is disclosed in US Published Patent Application No. 2007/07106479 (expressly incorporated hereinto by reference) which proposes instead of a fixed structure to use a moveable door that is opened only when the APU is operating. Although this prior proposal appears to provide for reduced fuel consumption and noise, there are many technical problems that are associated with such proposal. First, it is a relatively high cost solution due to the mechanical actuators needed to open and close the door. Second, the solution is not simple, due to the electrical or pneumatic system required to install and power the actuators. Third, there is a relatively high impact on aircraft weight as compared to a fixed diverter already existing and installed on many commercial aircraft. Finally, and perhaps most importantly, due to the system complexity, there can be aircraft dispatch reliability issues in the event of a component failure associated with the moveable door.

SUMMARY

In order to further reduce the aircraft drag in the region of the APU air inlet, there are disclosed herein various embodiments of improved diverter structures that achieve a geometry profile having more efficient aerodynamic characteristics. In addition, the new and innovative diverter provided by the embodiments disclosed herein improve the air flow distribution and increase the APU pressure recovery due to the addition of an aerodynamic fairing. Moreover, these improved aerodynamic characteristics are achieved while observing all of the APU design constraints and maintaining the same functionality of the diverters currently in service (i.e., to avoid any undesired fluid from reaching the APU compressor).

The aerodynamically improved diverter structures of the embodiments disclosed herein were developed for the APU air inlets and generally include a leading edge that avoids airflow stagnation in the front region of the aircraft and defines a relatively smooth ramp in the aft region, thereby avoiding airflow detachment and increasing the average total pressure recovery. From numerical simulations and from flight-tests it has been confirmed that the diverter structures in accordance with the embodiments disclosed herein decreased the excrescence drag of the aircraft and therefore contributed to a decreased fuel burn. The embodiments of the diverter structures disclosed herein also improved the inlet total pressure recovery, which benefits the efficiency of the machine, in this case the APU.

According to some embodiments, diverter assemblies for an aircraft air inlet are provided which comprise a diverter structure at least substantially surrounding the air inlet, and a fairing mounted to an upper edge of the diverter structure forwardly of the air inlet. The fairing may be a solid structure which defines a relatively smooth ramp which slopes aftward toward the in the air inlet to thereby avoid airflow detachment forwardly of the air inlet. The diverter structure may have a substantially S-shaped cross-sectional configuration.

A fairing bracket may also be provided which is positioned along a forward edge of the air inlet such that the aft edge of the fairing is attached to the fairing bracket. In certain embodiments, the fairing may comprise a forward apex region, a concavely curved aft region defining a corresponding concavely curved aft edge and laterally divergent side regions joining the forward apex and aft regions.

The fairing bracket may itself have an S-shaped cross-sectional configuration. In such a configuration, the fairing bracket may include a lower base flange, an upper support flange and an intermediate support member which rigidly joins the lower base and upper support flanges to one. In some embodiments, the upper support flange is positioned rearwardly of the lower base flange so that the aft edge of the fairing overhangs a forward edge of the air inlet.

According to other embodiments, the air inlet includes an air scoop extending outwardly therefrom. The diverter may thus have a generally U-shaped member which substantially surrounds the air inlet and includes a base member connected to the aircraft, a support member and an upright member joining the base and support members to one another. In such embodiments, the fairing may include an aft region which slopes downwardly and rearwardly towards the air inlet.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 5:
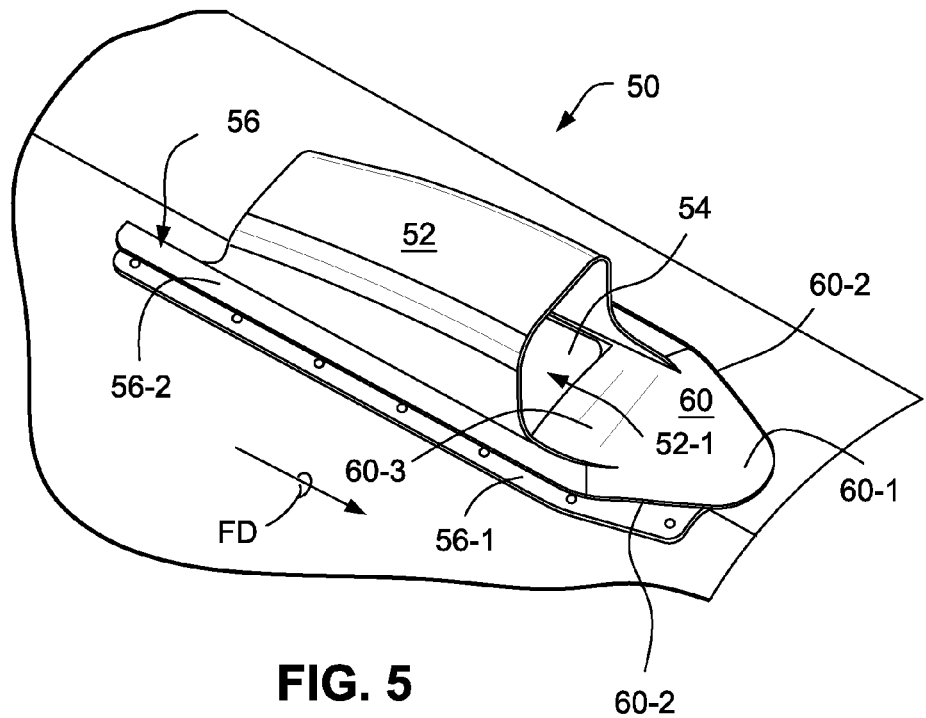
Figure 6:
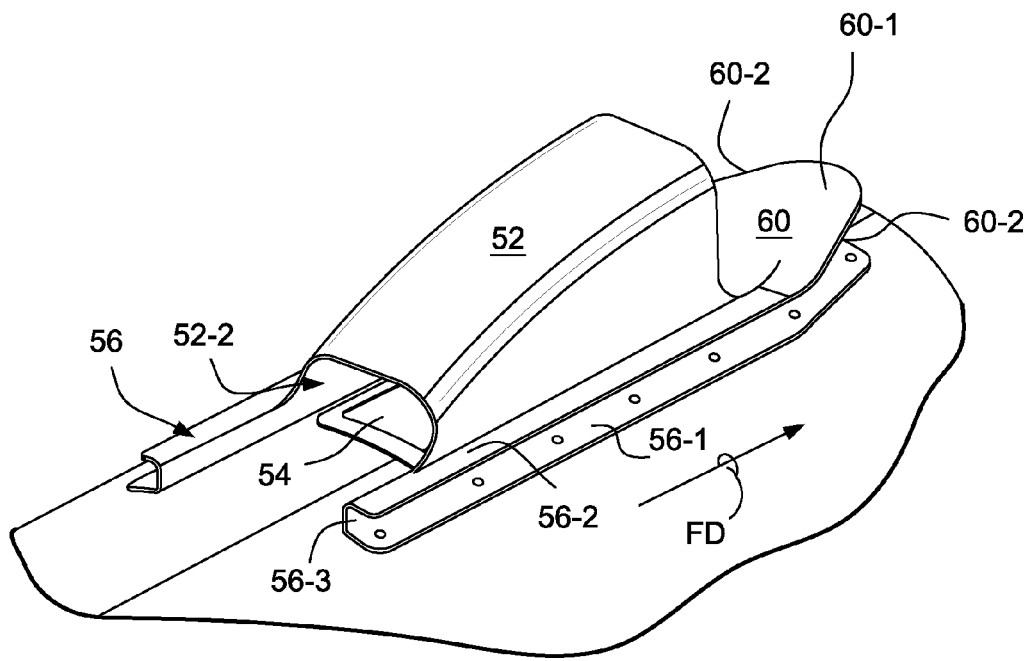
Figure 7:
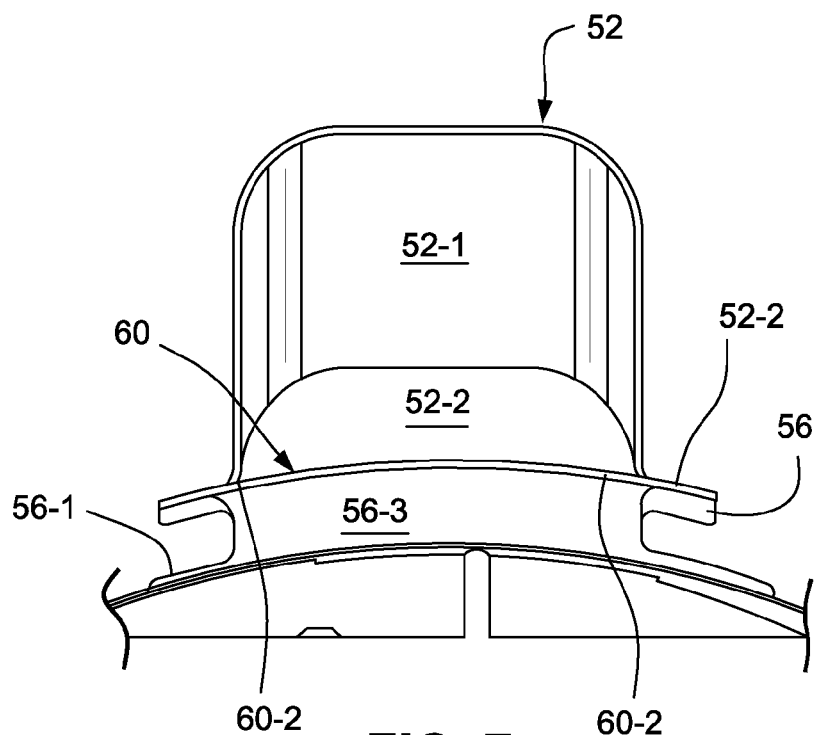
Figure 8:
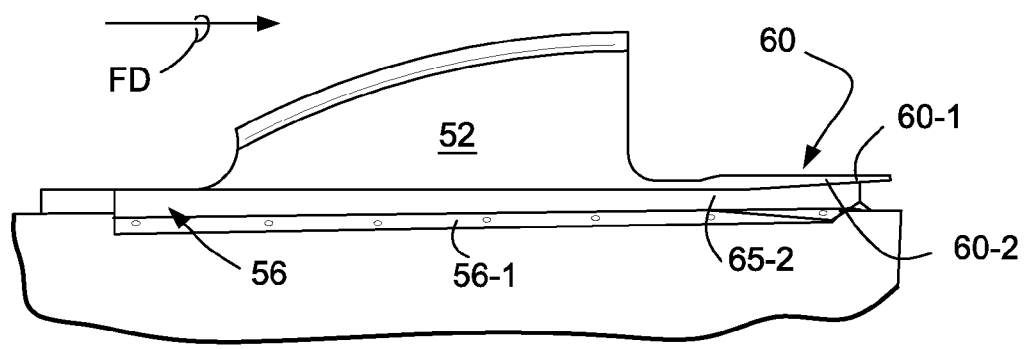

FIGS. 5 and 6 are schematic bottom front and rear perspective views, respectively, of an APU Air Cooling Oil Cooler (ACOC) which employs a diverter assembly according to an and its associated conventional diverter structure; and FIGS. 7 and 8 are front and side elevational views, respectively of the APU ACOC and its associated diverter assembly as shown in FIGS. 5 and 6.

DETAILED DESCRIPTION

Many of the details, dimensions, angles and other features shown in the figures of the present patent application are merely illustrative of particular embodiments of the invention. Accordingly, other embodiments can have other details, dimensions, angles and features, without departing from the spirit or scope of the present inventions.

Figure 1:
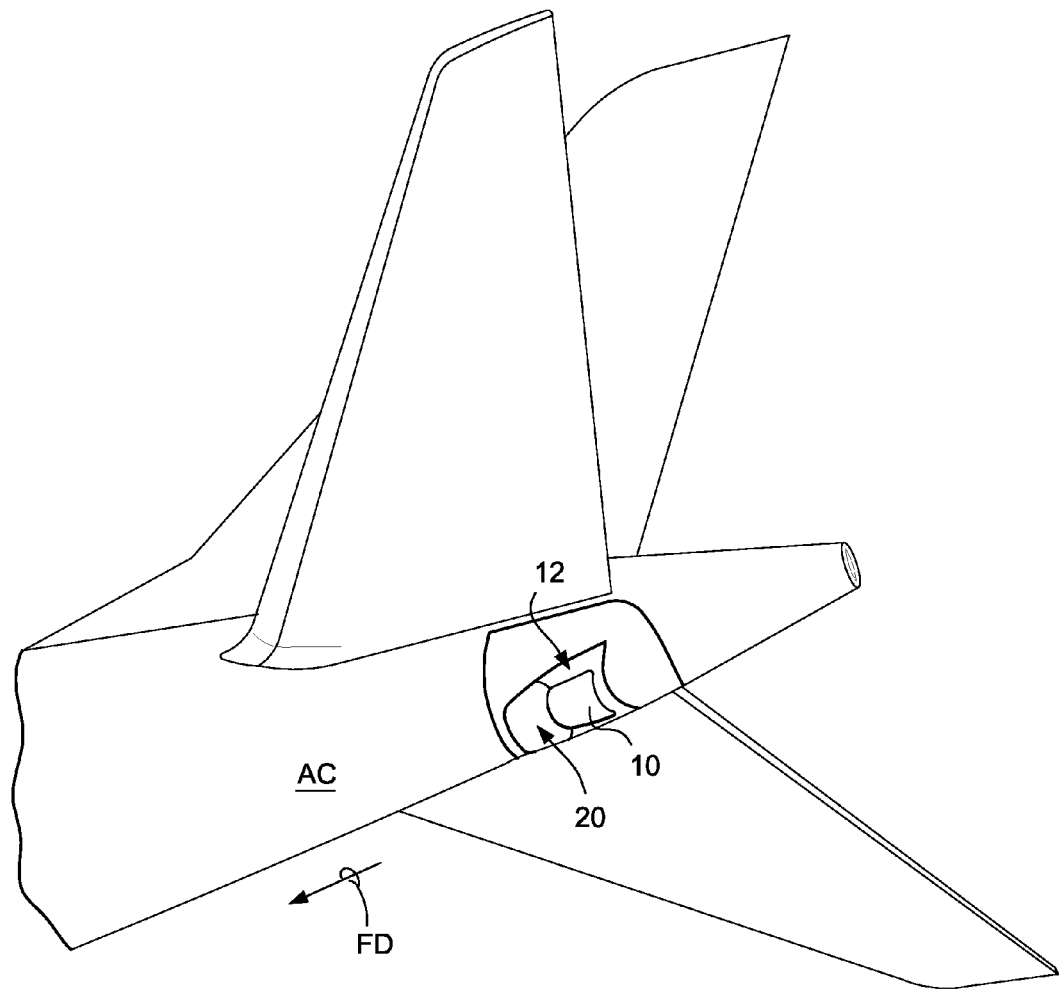
FIG. 1 is a bottom perspective view of an aircraft tail section provided with an APU air inlet and diverter structure.
Figure 3:
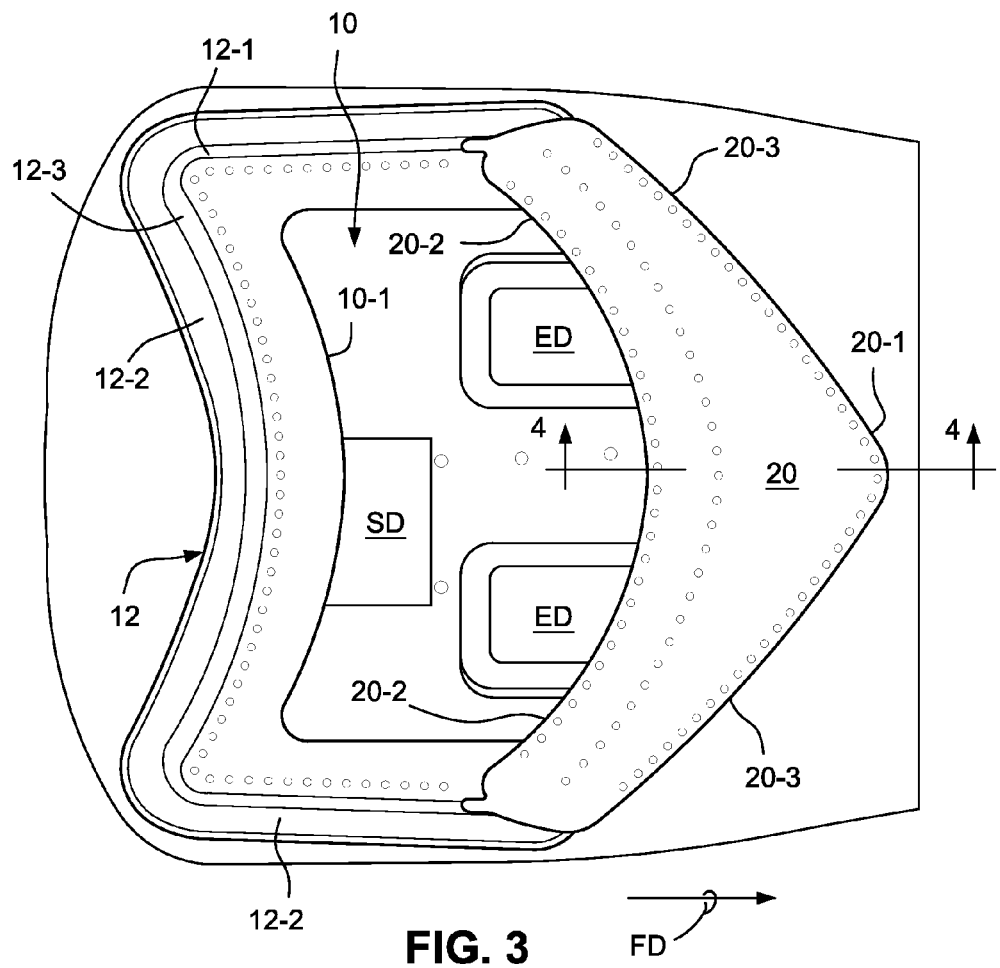
FIG. 3 is a plan view as viewed from below the aircraft tail depicted in FIG. 1 of the air inlet diverter assembly as shown in FIG. 2.

Accompanying FIG. 1 shows an APU inlet associated with an APU (e.g., APU APS 2300 model manufactured by Hamilton Sundstrand, not shown) installed in the tailcone fuselage of an aircraft AC, e.g., inside a dedicated compartment surrounded by a firewall (not shown). The APU is mounted in relation to an inlet 10 which allows inlet airflow to be received through an inlet silencer duct SD (positioned at 6 o'clock as shown in FIG. 3), and to discharge exhaust through an acoustic muffler that is mounted to exhaust ducts ED of the APU to reduce associated noise. The external perimetrical edge 10-1 of air inlet 10 is entirely surrounded by a contiguous fluid diverter in order to prevent ingestion of inflammable liquids by the APU compressor.

Figure 2:
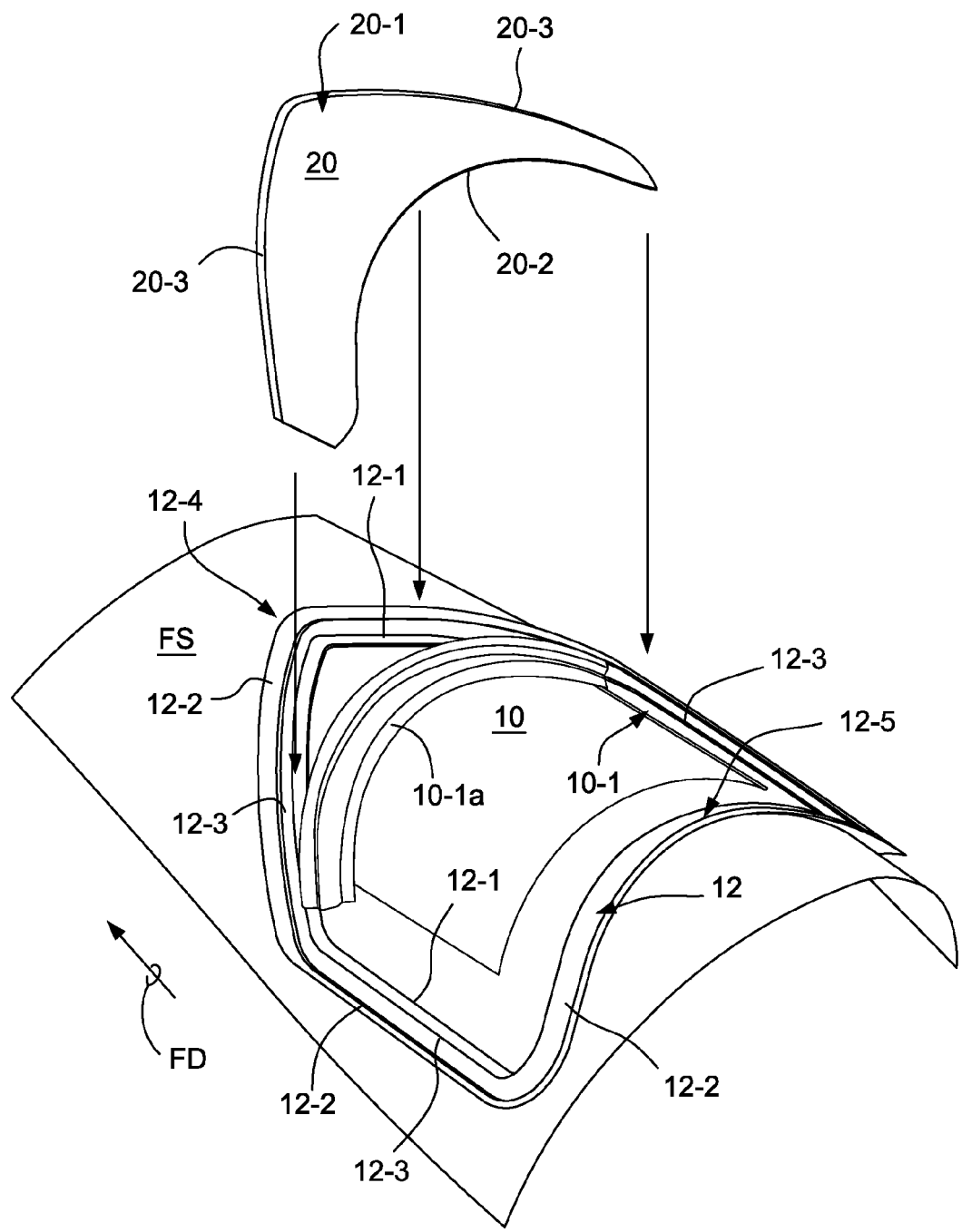
FIG. 2 is a schematic exploded view of an air inlet diverter assembly according to one embodiment of the invention.

A conventional APU air inlet diverter 12 is typically installed as depicted in FIG. 2 in a manner which completely bounds the air inlet 10. More specifically, the diverter 12 is a generally S-shaped structure in cross-section having a base member 12-1 rigidly attached to the fuselage skin FS of the aircraft 10 immediately adjacent of the inlet 10, an upper member 12-2 and an upright support member 12-3 which rigidly joins the base and upper support members 12-1, 12-2 such that the latter is outwardly and angularly disposed relative to the inlet 10 (see FIG. 4).

The diverter 12 will typically include a forward apex region 12-4 relative to the flight direction FD of the aircraft AC in order to improve its aerodynamic flow characteristics with an aft region 12-5 that is generally transverse to the airflow during flight. However, due to its geometry characteristics, for instance its width (W) and attack angle ($\alpha$), the diverter 12 acts as an obstacle to the air flow that passes through the region of the air inlet 10 and hence increases the excrescence drag of the aircraft AC.

As shown, e.g., in FIGS. 2 and 3, according to some embodiments of the present invention, a fairing assembly 20 is provided forwardly of the air inlet 10 in aerodynamic cooperation with the fluid diverter 12. In this regard, the fairing assembly 20 is preferably an arcuately curved piece of solid material (e.g., aluminum sheet) having a forward apex end 20-1 conforming to the apex region 12-4 of the diverter 12 and a aft end 20-2 having a curved rear edge conforming to the curvature of forward section 10-1a of edge 10-1 of the inlet 10. The fairing assembly thus provides a relatively smooth aerodynamic ramp which slopes aftward (relative to the flight direction FD of the aircraft AC) toward the air inlet 10 to thereby avoid airflow detachment forwardly thereof. The side edges 20-3 of the fairing assembly 20 diverge outwardly and rearwardly from the forward apex end 20-1 to the aft end 20-2 of the fairing 20.

Figure 4:
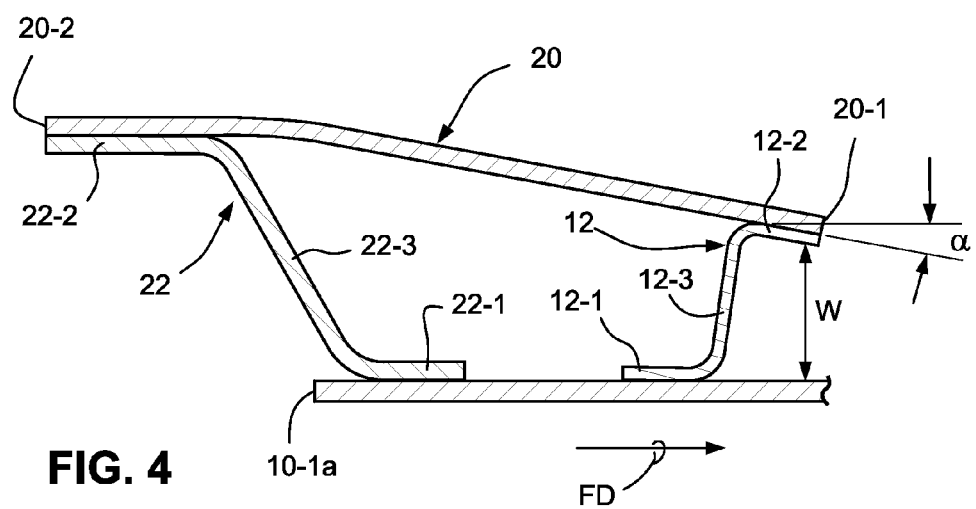
FIG. 4 is a greatly enlarged partial cross-sectional view of the fairing region associated with the diverter assembly depicted in FIG. 3 as taken generally along lines 4-4 therein.

As is shown in FIGS. 2 and 4, the forward apex end 20-1 and side edges 20-3 of fairing assembly 20 is supported physically by an underlying portion of the diverter 12. More specifically, the forward apex end 20-1 and side edges 20-3 are joined rigidly (e.g., via flush rivets) to the upper support member 12-2 of the diverter 12. An S-shaped fairing support bracket 22 (or Z-shaped as viewed in the orientation of FIG. 4) is positioned adjacent the forward edge 10-1a of the inlet 10 in order to support the rear edge 20-2 of the fairing 20. As shown, e.g., in FIG. 4, the fairing support bracket 22 includes (relative to the aircraft AC) a lower base flange 22-1, an upper support flange 22-2 and an intermediate support member 22-3 which rigidly joins the lower base and upper support flanges 22-1, 22-2 to one another such that the latter is rearwardly positioned relative to the former and relative to the flight direction (FD) of the aircraft. The rear edge 20-2 of the fairing 20 may thus be joined rigidly to the upper support flange 22-2 (e.g., via flush riveting). As is shown in FIG. 4, this rearward positioning of the rear edge 20-2 of the fairing 20 by means of the fairing support 22 creates an overhang in an aft direction of the rear edge 20-2 relative to the forward edge 10-1a of the inlet 10 (and relative to the inlet 10 itself). This overhang thus improves the aerodynamic characteristics of the inlet 10 by reducing drag in the region thereof.

As can be seeing in FIGS. 5-8, the aerodynamic principles discussed above may similarly be applied to an APU Air Cooling Oil Cooler (ACOC) air inlet assembly 50 which may typically be mounted in an upper tail cone region of the aircraft AC. In this regard, the APU ACOC air inlet assembly 50 will typically include an air scoop 52 positioned over the ACOC air inlet 54. For aerodynamic purposes, the air scoop 52 will include a larger surface area entrance opening 52-1 and will slope rearwardly relative to the flight direction FD of the aircraft AC to a smaller surface area exit opening 52-2. Since the air scoop 52 covers the ACOC air inlet 54, some of the air flowing between the entrance and exit openings 52-1, 52-2, respectively, will enter through the ACOC inlet 54 to serve as cooling air.

The ACOC inlet 54 is surrounded forwardly and laterally by a generally outwardly directed (relative to the inlet 54) U-shaped diverter 56 having a base member 56-1, an upper support member 56-2 and an upright support 56-3 joining the base and upper support members 56-1, 56-2. A solid sheet (e.g., aluminum) fairing 60 is mounted rigidly (e.g., via riveting) to a portion of the upper support member 56-2 forwardly of the entrance opening 52-1 of air scoop 52. The fairing 60 has a forward apex end 60-1 and lateral side edges 60-2 which diverge outwardly and rearwardly relative to the flight direction FD of the aircraft AC. The apex end 60-1 and the lateral divergent side edges 60-2 are rigidly joined (e.g., via riveting) to respective underlying portions of the upper support member 56-2 of the diverter 56. An aft end 60-3 of the fairing 60 slopes downwardly and rearwardly so as to terminate in generally flush and adjacent to the ACOC inlet 54. In such a manner, airflow through the scoop 50 and into the inlet 54 is improved while decreasing aerodynamic draft associated with the diverter 56.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A diverter assembly for an aircraft air inlet opening, wherein the diverter assembly comprises:
   a diverter structure comprising a base member attached to a fuselage region of the aircraft so as to at least partially surround forward and lateral edge portions of a perimetrical edge defining the air inlet opening, an upper support member spaced above the base member, and an upright member connecting the base member to the support member, and
   a fairing mounted to a forward portion of the support member of the diverter structure so that the fairing is mounted above the aircraft fuselage region forwardly of the air inlet opening, wherein
   the fairing comprises an apex end forwardly of the air inlet opening and laterally divergent side regions, and wherein
   the fairing includes a rear edge region disposed over a forward edge of the air inlet opening.

2. The diverter assembly as in claim 1, wherein the fairing is a solid structure which defines a relatively smooth ramp which slopes aftward toward a forward edge of the in the air inlet opening to thereby avoid airflow detachment forwardly of the air inlet opening.

3. The diverter assembly as in claim 1, wherein the air inlet opening includes an air scoop extending outwardly therefrom.

4. The diverter assembly as in claim 1, wherein the diverter structure has a substantially S-shaped cross-section comprised of the base member, the upper support member and the upright member.

5. The diverter assembly as in claim 1, further comprising a fairing support bracket positioned along a forward edge of the air inlet opening rearwardly of the diverter structure, wherein an aft edge of the fairing is attached to the fairing bracket.

6. The diverter assembly as in claim 1, wherein the fairing comprises a concavely curved aft region defining a corresponding concavely curved aft edge, wherein the laterally divergent side regions join the forward apex and aft regions of the fairing.

7. The diverter assembly as in claim 6, further comprising an S-shaped fairing bracket positioned along a forward edge of the air inlet opening rearwardly of the diverter structure, wherein an aft edge of the fairing is attached to the fairing bracket.

8. The diverter assembly as in claim 7, wherein the fairing bracket includes a lower base flange, an upper support flange and an intermediate support member which rigidly joins the lower base and upper support flanges to one.

9. The diverter assembly as in claim 8, wherein the upper support flange is positioned relative to the lower base flange so that an aft edge of the fairing overhangs a forward edge of the air inlet opening.

10. The diverter assembly as in claim 3, wherein the diverter is a generally U-shaped member comprising the base member, the support member and the upright member.

11. The diverter assembly as in claim 1, wherein the fairing includes an aft region which slopes downwardly and rearwardly towards the air inlet opening.

12. An aircraft which comprises a diverter assembly as in any one of claims 1-11.

* * * * *